United States Patent
Phan Huy et al.

(10) Patent No.: US 8,457,217 B2
(45) Date of Patent: Jun. 4, 2013

(54) METHOD OF DYNAMIC CONTROL OF THE FOCUSING OF A SIGNAL PRE-EQUALIZED BY TIME REVERSAL

(75) Inventors: Dinh Thuy Phan Huy, Paris (FR); Joe Wiart, Lagny sur Marne (FR); Youmni Ziade, Bourg la Reine (FR); Jean-Philippe Desbat, Paris (FR)

(73) Assignee: France Telecom, Paris (FR)

( * ) Notice: Subject to any disclaimer, the term of this patent is extended or adjusted under 35 U.S.C. 154(b) by 273 days.

(21) Appl. No.: 12/996,802

(22) PCT Filed: Jun. 26, 2009

(86) PCT No.: PCT/FR2009/051237
§ 371 (c)(1),
(2), (4) Date: Dec. 8, 2010

(87) PCT Pub. No.: WO2009/156703
PCT Pub. Date: Dec. 30, 2009

(65) Prior Publication Data
US 2011/0103457 A1      May 5, 2011

(30) Foreign Application Priority Data
Jun. 27, 2008   (FR) ..................... 08 54358

(51) Int. Cl.
*H04L 27/00* (2006.01)
(52) U.S. Cl.
USPC ........................................ 375/259
(58) Field of Classification Search
USPC .............. 375/219, 220, 221, 259, 285
See application file for complete search history.

(56) References Cited

U.S. PATENT DOCUMENTS

| | | | |
|---|---|---|---|
| 2002/0039217 A1* | 4/2002 | Saunders et al. | 359/161 |
| 2003/0064744 A1* | 4/2003 | Zhang et al. | 455/522 |
| 2003/0109221 A1* | 6/2003 | You et al. | 455/13.4 |
| 2003/0138053 A1 | 7/2003 | Candy et al. | |
| 2005/0185733 A1* | 8/2005 | Tolli et al. | 375/285 |
| 2011/0111790 A1* | 5/2011 | Andersson et al. | 455/522 |

OTHER PUBLICATIONS

Gomes et al., "Time-Reversed OFDM Communication in Underwater Channels," 2004 IEEE 5$^{th}$ Workshop on Signal Processing Advances in Wireless Communications, Lisbon, Portugal, Jul. 11-14, 2004, Piscataway, NJ, USA, IEEE, pp. 626-630 (Jul. 11, 2004).

Pajusco et al., "Characterization of UWB Time Reversal Using Circular Array Measurements," Proceedings of the 10$^{th}$ European Conference on Wireless Technology, pp. 102-105 (Oct. 1, 2007).

(Continued)

*Primary Examiner* — Don N Vo
(74) *Attorney, Agent, or Firm* — Drinker Biddle & Reath LLP

(57) ABSTRACT

A method is provided for dynamically controlling the focus of a signal pre-equalized by time reversal of an estimated propagation channel between a source antenna of a source communicating entity and a destination antenna of a destination communicating entity at a current instant, said method comprising steps for evaluation by the destination communicating entity of a relative focus quality of the pre-equalized signal sent by the source antenna and received by the destination antenna, compared to a quality at a focal point, and if the evaluated relative focus quality does not satisfy a predetermined criterion, for request, by the destination communicating entity, to modify the focus addressed to the source communicating entity for a subsequent instant.

15 Claims, 3 Drawing Sheets

OTHER PUBLICATIONS

Sharma et al., "Compensating the Effects of Target Acceleration in Dual-Channel SAR-GMTI," IEE Proceedings: Radar, Sonar & Navigation, Institution of Electrical Engineers, GB, vol. 153 (1), pp. 53-62 (Feb. 16, 2006).

Tourin et al., "Time Reversal Telecommunications in Complex Environments," Comptes Rendus—Physique, Elsevier, Paris, France, vol. 7(7), pp. 816-822 (Sep. 1, 2006).

* cited by examiner

METHOD OF DYNAMIC CONTROL OF THE FOCUSING OF A SIGNAL PRE-EQUALIZED BY TIME REVERSAL

CROSS-REFERENCE TO RELATED APPLICATIONS

This application is the U.S. national phase of the International Patent Application No. PCT/FR2009/051237 filed Jun. 26, 2009, which claims the benefit of French Application No. 08 54358 filed Jun. 27, 2008, the entire content of which is incorporated herein by reference.

FIELD OF THE INVENTION

The field of the invention is that of telecommunications, and more specifically of the radiocommunication techniques between communicating entities.

More particularly, the invention relates to the transmission quality of a signal based on a time reversal technique between two communicating entities.

BACKGROUND

A radio signal transmitted by an antenna of a communicating entity undergoes deformations according to the propagation conditions between a source point defined at the output of the source antenna and a destination point defined at the input of an antenna of the destination communicating entity. In order to limit these deformations, the signal is first distorted by applying pre-equalization coefficients according to the characteristics of the propagation channel between these two antennas. It is therefore necessary to characterize this propagation channel.

Among the existing pre-equalization methods, the methods based on time reversal stand out because of their reduced complexity, their performance and their intrinsic capacity to focus a radiowave on a receiving antenna. Time reversal makes it possible to significantly reduce the time scattering of the propagation channel by focusing the energy of the received signal in time and in space.

Time reversal is a wave focusing technique, typically for acoustic waves, which relies on the invariance by time reversal of the wave equation. Thus, a temporally reversed wave is propagated like a direct wave going back in time. A brief pulse transmitted from a source point is propagated in a propagation medium. A portion of this wave received by a destination point is time-reversed before being returned in the propagation medium. The wave converges toward the source point, reforming a brief pulse at said source point and the energy of the wave is focused on the source point. The signal, focused by time reversal on the source point, is almost identical in its form to the original signal transmitted at the source point. There is thus time recompression at the source point. In particular, the returned wave converges all the more accurately when the propagation medium is complex.

The time reversal technique is thus applied to radio communication networks to cancel the effect of the propagation channel on the signal, notably by reducing the spreading of the channel, and to simplify the processing of symbols received after passing through the channel. The signal transmitted by an antenna of the source communicating entity is thus pre-equalized by the application of coefficients obtained from the time reversal of the impulse response of the propagation channel that this signal must pass through. The time reversal of the propagation channel applied to the signal makes it possible to cancel the effect of this channel during transmission of the duly pre-distorted signal from the source point, and to focus the signal on a destination antenna. Implementing time reversal thus requires knowledge of the propagation channel by the source communicating entity.

However, when the communicating entities are mobile, the estimation of the channel made at a given instant by a communicating entity may prove erroneous at a subsequent instant because of the mobility of the communicating entities. This error is qualified in relation to a relative movement defined as a function of the speed of displacement of the source communicating entity observed from the destination communicating entity. For significant relative movements, there is a decorrelation between the estimate of the propagation channel, applied for the pre-distortion of the signal, and the propagation channel actually experienced by the signal.

Thus, on the one hand, pre-distortion of the signal is inadequate and, on the other hand, the focusing of the signal on a destination antenna is not achieved. The technique of pre-equalization by time reversal therefore gives poor performance for communicating entities that are moving rapidly.

The defocusing of the signal is in fact caused by the relative movement but also by a latency delay. The latency delay is the overall delay comprising a processing delay between the measurement of the propagation channel and the transmission of the focused signal, and a propagation delay between the transmission and the reception of the focused signal.

The position of the destination antenna relative to the estimation of the propagation channel applied to the pre-equalized signal defines a focal point. The focal point thus corresponds to the position of the destination antenna relative to the source antenna before the latency delay has elapsed. In other words, the focal point corresponds to the point of convergence of the waves for static communicating entities and in the absence of latency delay. In the case of a displacement of one or both communicating entities during the latency delay, the destination antenna is at a position that differs from the position of the focal point relative to the source antenna, therefore the focal point is not observed.

When the focusing of the signal is not achieved, the service quality is degraded. The service quality is, for example, the bit rate offered or else an error ratio on the data conveyed by the signal. Thus, the service quality is degraded as soon as the destination communicating entity and/or the source communicating entity moves. This degradation increases when the relative movement of the source communicating entity relative to the destination communicating entity increases, this movement occurring during the latency time. In other words, the power received on the destination antenna decreases when the relative movement increases during the latency time. Furthermore, this degradation is a function of the carrier frequency of the pre-equalized signal.

It is therefore necessary for the source communicating entity to adapt transmission parameters relating to the focusing of a signal, notably as a function of the relative movement of the communicating entities, in order to guarantee a service quality that may be, for example, a bit rate offered or else an error ratio on the data conveyed. The transmission parameters are, for example, the latency delay or the carrier frequency of the transmitted signal. The communicating entity can also choose to change bandwidth, and therefore carrier frequency, within one and the same radio communication system, or else to switch over to a separate radio communication system operating in a separate bandwidth.

There is therefore a need for a method for dynamically controlling the focus of a signal pre-equalized by time reversal in order to adapt the transmission parameters of a signal pre-equalized by time reversal.

SUMMARY

The invention is suitable for communicating entities with at least one transmitting antenna and at least one receiving antenna. A communicating entity may be a mobile terminal, a radio access point, a terrestrial or satellite base station, or any equipment equipped with a communicating card.

This solution is also suitable for communicating entities with a number of transmitting antennas and/or a number of receiving antennas, for example for radio communication systems of the MIMO (Multiple Input, Multiple Output), SIMO (Single Input, Multiple Output) or MISO (Multiple Input, Single Output) type.

To achieve this objective, the invention proposes a method for dynamically controlling the focus of a signal pre-equalized by time reversal of an estimated propagation channel between a source antenna of a source communicating entity and a destination antenna of a destination communicating entity at a current instant. The method comprises steps for:
  evaluation by the destination communicating entity of a relative focus quality of the pre-equalized signal sent by the source antenna and received by the destination antenna, compared to a quality at a focal point, and if the evaluated relative focus quality does not satisfy a predetermined criterion,
  request, by the destination communicating entity, to modify the focus addressed to the source communicating entity for a subsequent instant.

This method thus makes it possible to dynamically adapt transmission parameters of a signal pre-equalized by time reversal according to a relative focus quality indication delivered by the destination communicating entity. The service quality is thus expressed by a relative focus quality determined from the signal received by the destination communicating entity. The evaluation of the relative focus quality, which exploits the space-time properties of the technique of pre-equalization by time reversal allows for a simple and rapid evaluation of the appropriate modifications to the transmission parameters. This method thus makes it possible to dynamically adjust the transmission parameters, notably as a function of the displacement of one or both of the communicating entities.

Notably, the relative focus quality is determined from a normalized representation of a received power curve, as a function of a distance between the destination antenna and the focal point, the representation being a decreasing function of the distance and having a maximum at the focal point.

The focus quality is thus expressed relative to a maximum quality that should be achieved at the focal point and not an absolute quality which depends on the carrier frequency. The focal point corresponds to the position of the destination antenna relative to the source antenna before the latency delay has elapsed. The normalized representation of a received power curve makes it possible to make performance comparisons for different transmission parameters and thus to select a more favorable configuration for the next instant in order to obtain a target service quality.

The modification request step comprises
  an estimation of a distance between the destination antenna at the current instant and a position corresponding to a target relative focus quality,
  a transmission of a modification request addressed to the source communicating entity including the estimation of said distance.

Thus, the destination communicating entity simply evaluates a distance deviation between the destination antenna and a position corresponding to a target relative focus quality, without using any complex processing on the signal which would induce additional processing times. The simple deviation datum then enables the source communicating entity to adjust the transmission parameters and so reduce or cancel this deviation.

The modification request step may also comprise
  an estimation of a deviation between the relative focus quality value evaluated at the current instant and a target relative focus quality value,
  a transmission of a modification request addressed to the source communicating entity including the estimation of the deviation.

Thus, the complexity of the destination communicating entity is limited to calculating the relative focus quality and to the deviation in relation to a target relative focus quality. The simple deviation datum then enables the source communicating entity to adjust the transmission parameters and so reduce or cancel this deviation.

The modification request step may also comprise:
  an estimation of a distance between the destination antenna at the current instant and a position corresponding to a target relative focus quality,
  a selection of a value for at least one parameter, for the next instant, chosen from a carrier frequency and a latency delay,
  a transmission of a request addressed to the source communicating entity, including a reference to the value of the at least one selected parameter.

Thus, the destination communicating entity simply evaluates a deviation between the destination antenna and a position corresponding to a target relative focus quality. It can then select transmission parameters enabling it to achieve or converge toward the target relative focus quality, and transmit its selection to the source communicating entity. The latter can then either modify the parameters according to the received request, or change the selection before modifying the parameters.

The selection, made by one or other of the communicating entities, makes it possible, for example, to allocate higher-frequency carrier frequencies for rapid displacement speeds. The selection may also include constraints relating, for example, to the occupancy of the carrier frequencies which makes it possible to optimize the allocation of the carrier frequencies according to the relative movement of the communicating entities. The selection may also observe real time service constraints requiring reduced latency delays. The selection may also consider a change of radio transmission system.

The modification request step may also comprise:
  a comparison between the estimation of the relative focus quality and a target relative focus quality,
  a determination of a variation index as a function of the result of the comparison,
  a transmission of a modification request addressed to the source communicating entity including the variation index.

Thus, the complexity of the communicating entity is limited to the calculation of the relative focus quality and a comparison in relation to a target relative focus quality. Depending on the comparison result obtained, the destination communicating entity simply requests a convergence toward or a distancing from the focal point. The simple comparison result datum then enables the source communicating entity to adjust the transmission parameters in order to converge toward or distance itself step by step from the focal point, during successive iterations.

Upon receipt of the modification request, the source communicating entity modifies a value for at least one parameter, for the next instant, chosen from a carrier frequency and a latency delay.

The source communicating entity modifies, for example, the carrier frequency and/or the latency delay for the next iteration. This modification is made following a selection of the transmission parameters made by the source communicating entity or else following a selection made by the destination communicating entity.

The invention also relates to a device, for a destination communicating entity, for dynamically controlling the focus of a signal pre-equalized by time reversal of an estimated propagation channel between a source antenna of a source communicating entity and a destination antenna of the destination communicating entity at a current instant. The device comprises:

means for evaluating a relative focus quality of the pre-equalized signal transmitted by the source antenna and received by the destination antenna, relative to a quality at a focal point, means for requesting a focus modification addressed to the source communicating entity for a subsequent instant.

The invention also relates to a device, for a source communicating entity, for dynamically controlling the focus of a signal pre-equalized by time reversal of an estimated propagation channel between a source antenna of a source communicating entity and a destination antenna of the destination communicating entity at a current instant. The device comprises:

means for receiving a focus modification request transmitted by the destination communicating entity, means for modifying a value for at least one parameter chosen from a carrier frequency and a latency delay.

The invention also relates to a communicating entity of a radio communication system comprising at least one of the devices for dynamically controlling focus according to the invention.

The invention also relates to a radio communication system comprising at least one communicating entity according to the invention.

The devices, the communicating entity and the system offer advantages similar to those described previously.

BRIEF DESCRIPTION OF THE DRAWINGS

Other features and advantages of the present invention will become more clearly apparent from reading the following description of a number of particular embodiments of the invention, and of the associated communicating entities, given as simple illustrative and nonlimiting examples, and the appended drawings, in which.

DETAILED DESCRIPTION

Figure 1:
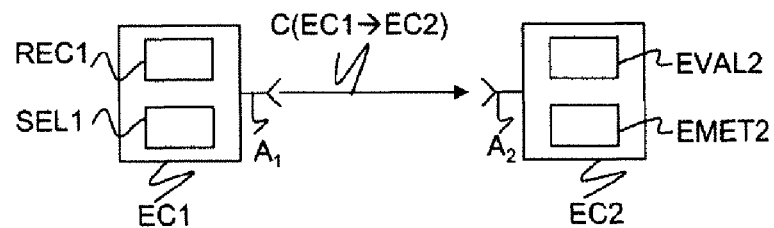
FIG. 1 is a schematic block diagram of a source communicating entity communicating with a destination communicating entity according to the invention.

Referring to FIG. 1, a communicating entity EC1 is able to communicate with a destination entity EC2 through a radio communication network that is not represented in the figure.

For example, the radio communication network is a cellular radio communication network of UMTS (Universal Mobile Communication System) type defined by the 3GPP (3rd Generation Partnership Project) specification organization, and its developments including 3GPP-LTE (Long Term Evolution) or a radio communication network of WIMAX (Worldwide Interoperability for Microwave Access) type.

The communicating entities may be mobile terminals, terrestrial or satellite base stations, access points, or any equipment equipped with a communicating card.

In the interests of clarity, the invention is described for the unidirectional transmission of a data signal from the communicating entity EC1 to a communicating entity EC2. The invention also relates to the bidirectional transmissions and also relates to the communicating entities that include a number of transmitting or receiving antennas.

The source communicating entity EC1 is capable of emitting a data signal from an antenna $A_1$ to the destination communicating entity EC2.

The destination communicating entity EC2 is arranged to receive the data signal and to restore the data from the signal received on an antenna $A_2$.

A data signal is prefiltered by applying coefficients of a time-reversed estimated impulse response. The impulse response is representative of the propagation channel $C(E1 \rightarrow E2)$ between the antenna of the source communicating entity $A_1$, called source antenna, and the antenna of the destination communicating entity $A_2$, called destination antenna.

In the case of a transmission in TDD mode, the transmissions in a first direction, for example from the source communicating entity to the destination communicating entity, and the transmissions in a second direction, the reverse of the first direction, are performed on one and the same carrier frequency at different instants. The estimation of the impulse response of the propagation channel is conventionally done by the source communicating entity based on the analysis of the transmission signals in the second direction.

In the case of a transmission in FDD mode, the transmissions in the first direction and the transmissions in the reverse direction are made in separate frequency bands. The knowledge by the source communicating entity of the propagation channel corresponding to the first transmission direction may be, for example, obtained by the delivery of an estimation of the propagation channel made by the destination communicating entity.

Depending on the transmission mode concerned, the source communicating entity or the destination communicating entity is thus arranged to perform the estimation of a propagation channel. If this estimation is made by the destination communicating entity, the latter is able to deliver the estimation to the source communicating entity, or to deliver pre-equalization coefficients obtained by time reversal of the estimation.

FIG. 1 shows only those means included in the source communicating entity EC1 and in the destination communicating entity EC2 that relate to the invention.

The source communicating entity EC1 and the destination communicating entity EC2 also include a central control unit, not represented, to which the included means are linked, and intended to control the operation of these means.

The source communicating entity comprises:
a receiver REC1 arranged to receive a focus modification request transmitted by the destination communicating entity,
a selector SEL1 arranged to modify a carrier frequency for the transmission of the data signals and/or a latency delay. The latency delay is defined by a configurable time interval separating the estimation of the impulse response of the propagation channel and the reception of the signal pre-equalized by time reversal of this estimation.

The destination communicating entity comprises:
an evaluator EVAL2 arranged to evaluate a relative focus quality, from a signal received by the destination antenna, relative to a quality at a focal point,
a transmitter EMET2 arranged to request a focus modification addressed to the source communicating entity.

The operation of the means introduced hereinabove is detailed hereinbelow by a description of the method for controlling the focus of a signal pre-equalized by time reversal.

Figure 2:
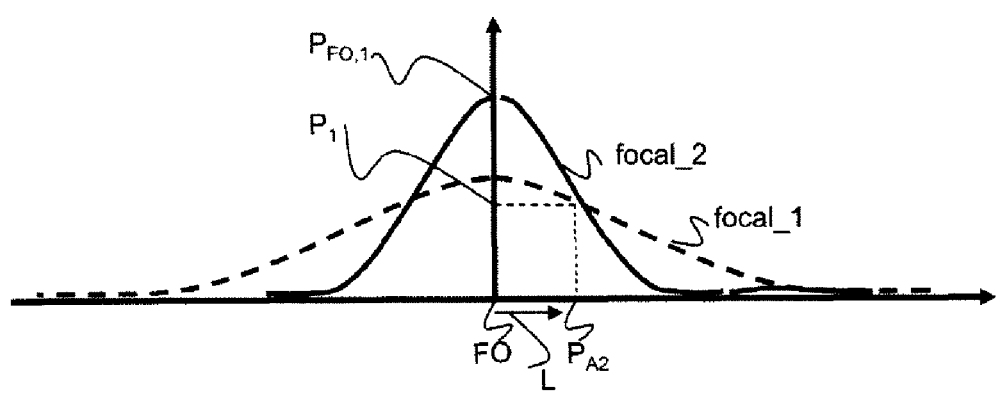
FIG. 2 represents examples of received power curves as a function of a distance between a destination antenna and a focal point.

In particular, the evaluator EVAL2 for evaluating the relative focus quality from a signal received by the destination communicating entity EC2 is described with reference to FIGS. 2 and 3.

The evaluator EVAL2 evaluates the relative focus quality of the signal received on the destination antenna $A_2$ relative to a quality value, for a focal point, of a normalized representation of a received power curve. The normalized representation of a received power curve as a function of a distance between the destination antenna and the focal point is also described in relation to FIGS. 2 and 3.

The power of a pre-equalized signal received on the destination antenna $A_2$ determines the quality of the signal, and thus a service quality which may, for example, be a bit rate offered or else an error ratio on the data. In the absence of relative movement v of the source communicating entity EC1 relative to the destination communicating entity EC2, and in the absence of any latency delay $D_L$, the power of a signal pre-equalized by time reversal is maximum at the wave convergence point, called focal point, which is located at the destination antenna. The latency delay $D_L$ should be understood to be the configurable time interval separating the estimation of the impulse response of the propagation channel and the reception of the signal pre-equalized by time reversal of this estimation. The focal point thus corresponds to the position of the destination antenna relative to the source antenna before the latency delay has elapsed.

As soon as the communicating entities move during the latency time, the focal point is no longer observed. This transgression is expressed as a function of the latency delay $D_L$ and of the relative movement v of the source communicating entity relative to the destination communicating entity. The distance between the destination antenna and the focal point is thus given by the product of the relative movement v, for example in the form of a speed, and of the latency time:

$$L = v \cdot D_L.$$

The relative movement v should be understood hereinbelow to be the displacement of the source communicating entity as seen from the destination communicating entity.

When the destination antenna is distant from the focal point, for example for an inappropriate latency delay, or during a displacement of one or the two communicating entities, the power is no longer maximum. FIG. 2 thus represents two exemplary representations of received power curves as a function of the distance between the destination antenna and the focal point. The function focal_1 corresponding to the transmission of a pre-equalized signal transmitted on a carrier frequency $f_1$ is maximum at the focal point FO and decreases monotonically as a function of the distance L to the focal point.

For a position of the destination antenna $P_{A2}$ at a distance L from the focal point, the received power $P_1$ is less than the received power $P_{FO.1}$ at the focal point.

The extent and the form of a received power curve depends on the propagation channel and notably on the carrier frequency of the signal. The representation of the received power curve spreads when the carrier frequency decreases. Thus, the function focal_1, corresponding to a frequency $f_1$ lower than the carrier frequency $f_2$, has a greater scope than the function focal_2.

The above properties are, for example, demonstrated in the article entitled "Signal Frequency and Bandwidth Effects on the Performance of UWB Time-Reversal Technique", whose authors are A. Khaleghi and G. El Klein, submitted in 2007 at the "Loughborough Antennas and Propagation Conference", pages 97 to 100.

In the general case, qualification of the focus quality may rely on a representation of the received power curve. This representation expresses the variation of the quality as a function of the distance to the focal point and depends on the carrier frequency of the signal. The representation is such that
its maximum value is reached at the focal point,
it is monotonically decreasing as a function of the distance between the destination antenna and the focal point.

It is also possible to consider a so-called normalized representation of the received power curve for which the maximum value is identical for all the carrier frequencies. The normalized representation is a monotonically decreasing function of the distance to the focal point and such that, for a given distance between the destination antenna and the focal point, if $Q_1$ and $Q_2$ are two relative focus quality values for respective carrier frequencies $f_1$ and $f_2$, $f_1$ being less than $f_2$, then $Q_1$ is greater than $Q_2$. Thus, for a position $P_{A2}$ of the destination antenna at a distance L from the focal point, the relative focus quality value $Q_1$, corresponding to the transmission of a pre-equalized signal for the carrier frequency $f_1$, is greater than the relative focus quality value $Q_2$, corresponding to the transmission of a pre-equalized signal for the carrier frequency $f_2$.

Figure 3:
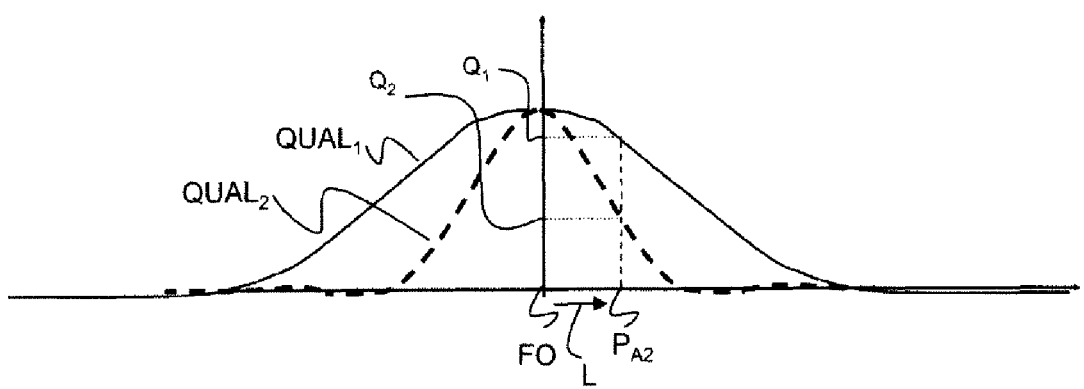
FIG. 3 represents an example of normalized representations of received power curves as a function of a distance between a destination antenna and a focal point.

FIG. 3 illustrates normalized representations of received power curves, the curve $QUAL_1$ corresponding to the transmission of a pre-equalized signal transmitted at a frequency $f_1$, and the curve $QUAL_2$ corresponding to the transmission of a pre-equalized signal transmitted on a frequency $f_2$, such that the frequency $f_1$ is less than the frequency $f_2$.

The relative focus quality of a signal received on the destination antenna is thus evaluated in relation to the value of the normalized representation according to the carrier frequency of the signal.

Relative focus quality evaluations are illustrated in a non-limiting manner by the following examples for which the normalized representations satisfy the properties described previously.

Thus, the relative focus quality is evaluated by the evaluator EVAL2 from the measurement of the relative movement v in order to determine a distance L between the destination antenna and the focal point. This distance L is thus determined by the product of the latency delay $D_L$ and the estimation of the relative movement v, for example in the form of a speed, such that:

$$L = v \cdot D_L.$$

The relative focus quality $Q_v$ is then expressed according to the wavelength $\lambda$ of the carrier frequency $f_p$ of the pre-equalized signal transmitted by the source antenna, with $\lambda = c/f_p$, c denoting the speed of light, such that $$Q_v = \frac{(\lambda/2) - L}{(\lambda/2)}$$

The relative focus quality $Q_{Bessel}$ can also be evaluated from the modeling of the received power curve by a 0 order Bessel function such that:

$$Q_{Bessel} = \text{Bessel}\left(\frac{L}{\lambda}\right).$$

The relative focus quality can also be evaluated from an estimation of the time symmetry of the received signal. To this end, the evaluator EVAL2 evaluates, for any carrier frequency $f_k$ of the bandwidth $B_{EC}$ allocated to the destination entity, a so-called signal symmetry index parameter given by:

$$IND_k = \frac{\text{Re}_k^2}{(\text{Re}_k + \text{Im}_k)^2},$$

with $\text{Re}_k$ and $\text{Im}_k$ respectively being the real and imaginary parts of the frequency representation $S(f_k)$ of the received data signal s(t). The relative focus quality $Q_{sym}$ is thus given by $$Q_{sym} = \frac{\sum_{k=1}^{N_f} IND_k}{N_f},$$

in which $N_f$ designates the number of carrier frequencies allocated to the destination communicating entity EC2 in the band $B_{EC}$.

The relative focus quality can also be evaluated from an estimation of time and power symmetry of the received signal. The evaluator EVAL2 of the destination communicating entity EC2 determines N time symmmetry values $Sym_t(n)$ of the received signal for different time deviations relative to the sample of the signal received at an instant $t_{max}$ corresponding to the highest value sample $s(t_{max})$:

$$Sym_t(n) = \frac{|s(t_{max} + t_{n+max}) - s(t_{max} - t_{n+max})|/\sqrt{E}}{(t_{n+max} - t_{max})/\tau}$$

in which E is the energy of the received signal, and $\tau$ the estimated time spreading factor of the received signal, n varying from 1 to N.

The number of symmetry values N is a configurable parameter of the destination communicating entity, the precision on the evaluation of the relative focus quality increasing with N.

Furthermore, the evaluator EVAL2 of the destination communicating entity determines N symmetry values $Sym_p(n)$ of the power of the received signal for different time deviations relative to the sample of the signal at the instant $t_{max}$ such that:

$$Sym_p(n) = \frac{\left[\sqrt{|s(t_{max} + t_{n+max})|^2 |s(t_{nmax} - t_{n+max})|^2}\,\right]/\sqrt{E}}{2(t_{n+max} - t_{max})/\tau}$$

The relative focus quality $Q_{symp}$ is thus given by:

$$Q_{symp} = \frac{1}{N} \sum_{n=1}^{N} \frac{(\pi^2/4) - [\text{atan}(Sym_t(n)) \cdot \text{atan}(Sym_p(n))]}{\pi^2/4},$$

in which atan designates the arc tangent operator.

The relative focus quality may also be evaluated from the estimation of a time spreading factor of the received signal relative to the time spread of a signal referring to the focal point. The time spread factor of a signal is also commonly referred to in the literature by the term "delay spread". To this end, the source communicating entity EC1 transmits a pulse to the destination communicating entity EC2. The latter thus receives an impulse response $h_c(t)$ of the propagation channel between the source antenna and the destination antenna. The evaluator EVAL2 of the destination communicating entity constructs a reference signal ref(t) from the received pulse to which is applied the time reversal of the estimation of the impulse response of the propagation channel $h_{rt}(t)$ used to pre-equalize the signal. In the frequency domain, the reference signal is thus given by:

$$REF(f) = H_{rt}(f) * H_c(f).$$

The relative focus quality $Q_{DS}$ is then given by the ratio between the time spread factor of the reference signal $DS_{ref}$ and the spread factor of the data signal $DS_{sig}$:

$$Q_{DS} = \frac{DS_{ref}}{DS_{sig}}.$$

The relative focus quality may also be evaluated from a ratio between the power of the received signal and the power of a reference signal. This power ratio is representative of an estimation of the self-correlation of the propagation channel.

To this end, the source communicating entity transmits a pulse or a pilot signal to the destination communicating entity. The evaluator EVAL2 of the destination communicating entity EC2 estimates an impulse response $h_c(t)$ of the propagation channel between the source communicating entity and the destination communicating entity, or, in an equivalent manner, the transfer function of the propagation channel $H_c(f)$.

The evaluator EVAL2 determines the power of the propagation channel. For example, the power of the propagation channel $P_c$ is evaluated relative to the bandwidth B of the signal and to the size W(B) of the bandwidth according to any power evaluation method well known to those skilled in the art:

$$P_c = \frac{1}{W(B)} \int_{f \in B} \|H_c(f)^* \times H_c(f)\|^2$$

The evaluator EVAL2 also determines the power of an equivalent channel $P_{eq}$. The equivalent channel is obtained by the product of the conjugate of the transfer function of the propagation channel $H_{rt}(f)$ corresponding to the impulse response used to focus the signal, and the transfer function $H_c(f)$:

$$H_{eq}(f) = H_{rt}(f)^* H_c(f)$$

The relative focus quality $Q_{EQ}$ is then given by the power ratio:

$$Q_{EQ} = \frac{\|P_{eq}\|^2}{\|P_c\|^2}.$$

The evaluation of the relative focus quality can also be obtained by a combination of the different evaluations described previously. Thus, considering the evaluations $Q_v$, $Q_{Bessel}$, $Q_{sym}$, $Q_{symp}$, $Q_{DS}$, $Q_{EQ}$, respectively defined from the relative movement and the wavelength, from the relative movement and the Bessel function, from the estimation of the time symmetry of the received signal, from the estimation of the time and power symmetry, from the time spread factor, and from the self-correlation of the channel, the relative focus quality is obtained by the application of an increasing monotonic combination function of the evaluations $Q_v$, $Q_{Bessel}$, $Q_{sym}$, $Q_{symp}$, $Q_{DS}$, and $Q_{EQ}$.

Figure 4:
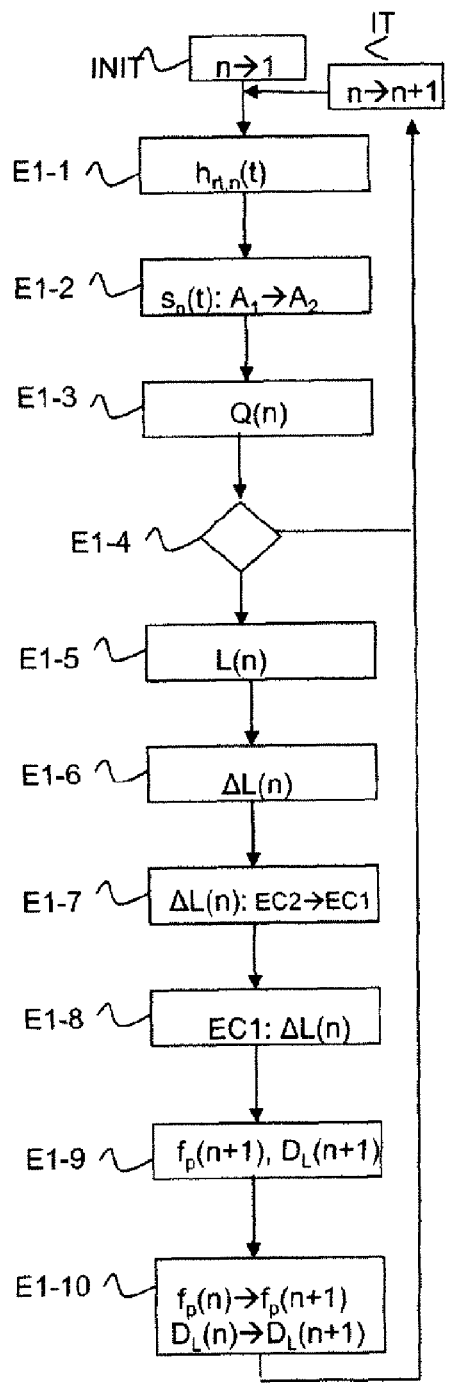
FIG. 4 represents the steps of the method for dynamically controlling the focus of a signal pre-equalized by time reversal according to a first embodiment.

A first embodiment of the method for dynamically controlling the focus of a signal pre-equalized by time reversal of an estimation of a propagation channel between a source antenna $A_1$ and a destination antenna $A_2$ is now described with reference to FIG. 4.

The method is reiterated according to a configurable iteration frequency $F_{iter}$. During the data transmission time from the source communicating entity EC1 to the destination communicating entity EC2, the iteration frequency may, for example, be determined according to the frequency with which an effective channel estimation is obtained. The iterations are symbolically represented by an iteration step IT with an index n. A preliminary initialization step INIT corresponds to the index n=1.

During the initialization step INIT, the source communicating entity selects a carrier frequency $f_p(1)$ and a latency delay $D_L(1)$ for the transmission of a data signal pre-equalized by time reversal. The carrier frequency and the latency delay corresponding to the $n^{th}$ iteration of the method are respectively denoted $f_p(n)$ and $D_L(n)$.

In the step E1-1, the source communicating entity determines pre-equalization coefficients to be applied to a data signal. The pre-equalization coefficients applied to a data or reference signal, transmitted at a current instant, are obtained by the time reversal of an estimated impulse response $h_{rt,n}(t)$ of a propagation channel $C_n$(EC1→EC2) between the source antenna $A_1$ and the destination antenna $A_2$.

This determination may be made, for example, by the transmission of pulses or pilot signals by the source communicating entity, followed by an estimation of the propagation channel respectively by the source or destination communicating entity, respectively according to the FDD or TDD transmission mode. In the case of an estimation made by the destination entity, the latter delivers the estimation to the source communicating entity.

In the step E1-2, the source communicating entity transmits from the source antenna $A_1$ the pre-equalized data signal $s_n(t)$ obtained after pre-filtering by the pre-equalization coefficients determined during the step E1-1.

In the step E1-3, the evaluator EVAL2 of the destination communicating entity evaluates a relative focus quality Q(n) from the received signal, for example according to one of the methods described previously.

In the step E1-4, the destination communicating entity EC2 determines, in light of the relative focus quality Q(n), whether there is a need to ask the source communicating entity EC1 for a focus modification. One criterion applied may, for example and in a nonlimiting manner, correspond to the comparison of the relative focus quality Q(n) to a target relative focus quality $Q_{target}$. If the deviation between the relative focus quality and the target relative focus quality is below a configurable threshold, the destination communicating entity does not request any focus modification.

If there is no need to request a focus modification, the iterations E1-5 to E1-10 are not carried out.

In a variant, the destination communicating entity does not apply any criterion and the iterations E1-5 and following are performed systematically.

In the step E1-5, the destination communicating entity estimates a distance L(n) between the destination antenna and the focal point at the current instant. The focal point corresponds to the position of the destination antenna relative to the source antenna on the $n^{th}$ iteration before the latency delay has elapsed.

The estimation of the distance L(n) may, for example, be made from reading a relative focus quality table. The configurable quality table contains measurement points for various positions of the destination antenna. These measurements may be made beforehand by simulations or by relative focus quality evaluations made during a learning period by the destination communicating entity.

In the case of an evaluation of the relative focus quality by a 0 order Bessel function as described previously, the evaluation of the distance may also be carried out based on the Bessel function, such that:

$$\text{Bessel}(L(n)) = Q(n).$$

In the step E1-6, the destination communicating entity estimates a distance $\Delta L(n)$ between the destination antenna and a position $P_{target}$ corresponding to the target relative focus quality $Q_{target}$.

The estimation of the distance $\Delta L(n)$ may, for example, be made from reading the relative quality table described previously making it possible to evaluate a target distance $L_{target}$ between the position $P_{target}$ and the focal point. The distance $\Delta L(n)$ is then obtained by the difference between L(n) and $L_{target}$.

In the case of an evaluation of the relative focus quality by a 0 order Bessel function as described previously, the evaluation of the target distance $L_{target}$ may also be made from the Bessel function, such that:

$$\text{Bessel}(L_{target}) = Q_{target}$$

In a variant, the estimation of the distance $\Delta L(n)$ may also be made from the value $L_{target}$ stored in the destination communicating entity.

In the step E1-7, the transmitter EMET2 of the destination communicating entity sends a focus modification request to the source communicating entity.

This request corresponds to the transmission of a request containing the estimation of the distance $\Delta L(n)$ determined during the step E1-6.

In the step E1-8, the receiver REC1 of the source communicating entity receives the focus modification request and extracts the estimation of the distance $\Delta L(n)$ contained in the request.

In the step E1-9, the source communicating entity selects a value for at least one parameter chosen from a carrier frequency and a latency delay.

The selection is made on the basis of the properties of the normalized representation of a received power curve illustrated in FIG. 3, which is such that:
- on the one hand, it is decreasing as a function of the distance to the focal point and therefore as a function of the product of the relative movement $v$ and of the latency delay $D_L$,
- and, on the other hand, it is such that, for a given distance $L(n)$ between the destination antenna and the focal point, if $Q_1$ and $Q_2$ are two relative focus quality values for respective carrier frequencies $f_1$ and $f_2$, $f_1$ being less than $f_2$, then $Q_1$ is greater than $Q_2$.

The source communicating entity can thus select a new carrier frequency, or select a new latency delay, or even select both the carrier frequency and the latency delay in order to honor the focus modification request. The selection is thus made by comparing different normalized representations of the received power curves for different carrier frequencies. These normalized received power curve representations are, for example, pre-stored in the source communicating entity in the form of a quality table.

The selection can be made by choosing a carrier frequency from one and the same frequency band, but also from a separate frequency band or even by choosing another radio communication system.

In the step E1-10, the selector SEL1 of the source communicating entity modifies the transmission parameters selected during the step E1-9. The steps of the method are then reiterated with this new pair of parameters $f_p(n+1)$, $D_L(n+1)$.

These new parameters can be taken into account by the destination communicating entity after notification by the source communicating entity, or else by blind-type time and frequency synchronization methods that are well known to those skilled in the art.

Figure 5:
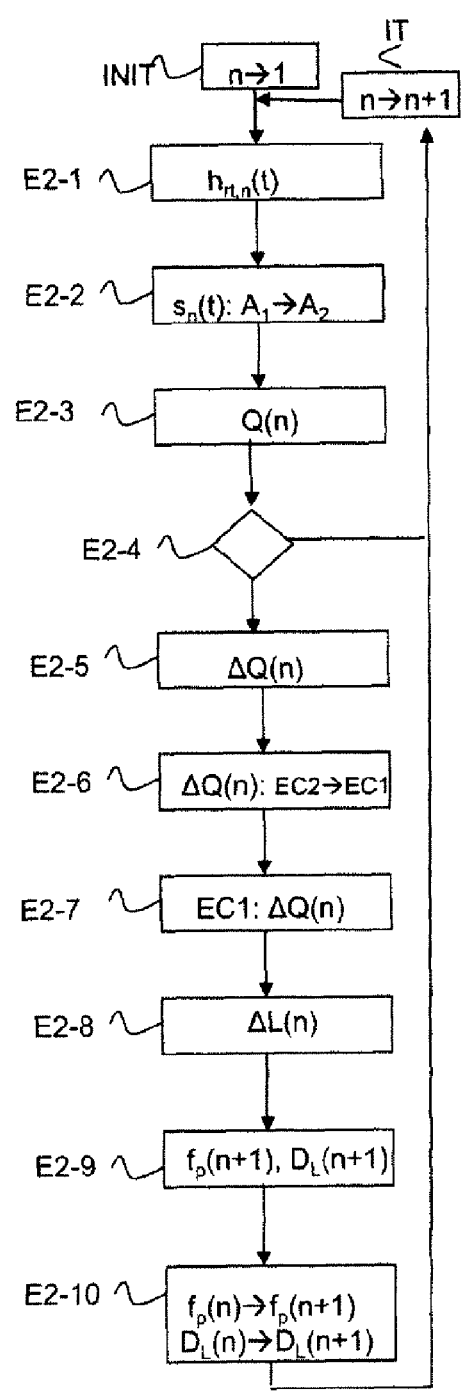
FIG. 5 represents the steps of the method for dynamically controlling the focus of a signal pre-equalized by time reversal according to a second embodiment.

A second embodiment of the method for dynamically controlling the focus of a signal pre-equalized by time reversal between a source communicating entity EC1 and a destination communicating entity EC2 is now described with reference to FIG. 5.

The method is reiterated according to a configurable iteration frequency $F_{iter}$. During the data transmission time from the source communicating entity to the destination communicating entity, the iteration frequency may, for example, be determined as a function of the frequency with which an effective channel estimation is obtained. The iterations are symbolically represented by an iteration step IT with an index n. A preliminary initialization step INIT corresponds to the index n=1.

During the initialization step INIT, the source communicating entity selects a carrier frequency $f_p(1)$ and a latency delay $D_L(1)$ for the transmission of a data signal pre-equalized by time reversal. The carrier frequency and the latency delay corresponding to the $n^{th}$ iteration of the method are respectively denoted $f_p(n)$ and $D_L(n)$.

In the step E2-1, the source communicating entity determines pre-equalization coefficients to be applied to a data signal. The pre-equalization coefficients applied to a data or reference signal, transmitted at a current instant, are given by the time reversal of an estimated impulse response $h_{rt,n}(t)$ of a propagation channel $C_n(EC1 \rightarrow EC2)$ between the source antenna $A_1$ and the destination antenna $A_2$.

This determination can be made, for example, by the transmission of pulses or pilot signals by the source communicating entity, followed by an estimation of the propagation channel respectively by the source or destination communicating entity, respectively according to the FDD or TDD transmission mode. In the case of an estimation made by the destination entity, the latter delivers the estimation to the source communicating entity.

In the step E2-2, the source communicating entity transmits from the source antenna $A_1$ the pre-equalized data signal $s_n(t)$ obtained after pre-filtering by the pre-equalization coefficients determined during the step E2-1.

In the step E2-3, the evaluator EVAL2 of the destination communicating entity evaluates a relative focus quality $Q(n)$ from the received signal, for example according to one of the methods described previously.

In the step E2-4, the destination communicating entity EC2 determines, in light of the relative focus quality $Q(n)$, whether there is a need to ask the source communicating entity EC1 for a focus modification. One criterion applied may, for example and in a nonlimiting manner, correspond to the comparison of the relative focus quality $Q(n)$ to a target relative focus quality $Q_{target}$. If the deviation between the relative focus quality and the target relative focus quality is below a configurable threshold, the destination communicating entity does not request any focus modification.

If there is no need to request a focus modification, the iterations E2-5 to E2-10 are not carried out.

In a variant, the destination communicating entity does not apply any criterion and the iterations E2-5 and following are performed systematically.

In the step E2-5, the destination communicating entity estimates a relative quality deviation $\Delta Q(n)$ between the target relative focus quality $Q_{target}$ and the relative focus quality $Q(n)$.

In the step E2-6, the transmitter EMET2 of the destination communicating entity sends a focus modification request to the source communicating entity.

This request corresponds to the transmission of a request containing the estimation of the relative quality deviation $\Delta Q(n)$ determined during the step E2-5.

In the step E2-7, the receiver REC1 of the source communicating entity receives the focus modification request and extracts from the request the estimation of the relative quality deviation $\Delta Q(n)$.

In the step E2-8, the destination communicating entity estimates, from the value $\Delta Q(n)$, a distance $\Delta L(n)$ between the destination antenna and a position $P_{target}$ corresponding to the target relative focus quality $Q_{target}$.

The estimation of the distance $\Delta L(n)$ may, for example, be made from reading a configurable relative quality table containing relative focus quality measurement points as a function of distance to the focal point. These measurements may be made beforehand using simulations.

In the case of an evaluation of the relative focus quality by a 0 order Bessel function as described previously, estimation of the distance $\Delta L(n)$ may also be obtained from application of the Bessel function.

In the step E2-9, the source communicating entity selects a value for at least one parameter chosen from a carrier frequency and a latency delay.

The selection is made on the basis of the properties of the normalized representation of a received signal power curve illustrated in FIG. 3 which is such that:

on the one hand, it is decreasing as a function of the distance to the focal point and therefore as a function of the product of the relative movement v and of the latency delay $D_L$, and, on the other hand, is such that, for a given distance $L(n)$ between the destination antenna and the focal point, if $Q_1$ and $Q_2$ are two relative focus quality values for respective carrier frequencies $f_1$ and $f_2$, $f_1$ being less than $f_2$, then $Q_1$ is greater than $Q_2$.

The source communicating entity can thus select a new carrier frequency, or else select a new latency delay, or even select both carrier frequency and latency delay in order to honor the focus modification request. The selection is thus made by comparing the various normalized representations for the various carrier frequencies. These normalized representations of received power curves are, for example, pre-stored in the source communicating entity in the form of a quality table.

The selection can be made by choosing a carrier frequency from one and the same frequency band, but also from a distinct frequency band or even by choosing another radio communication system.

In the step E2-10, the selector SEL1 of the source communicating entity modifies the transmission parameters selected during the step E2-9. The steps of the method are reiterated with this new pair of parameters $f_p(n+1)$, $D_L(n+1)$.

These new parameters can be taken into account by the destination communicating entity after notification by the source communicating entity, or by blind-type time and frequency synchronization methods well known to those skilled in the art.

Figure 6:
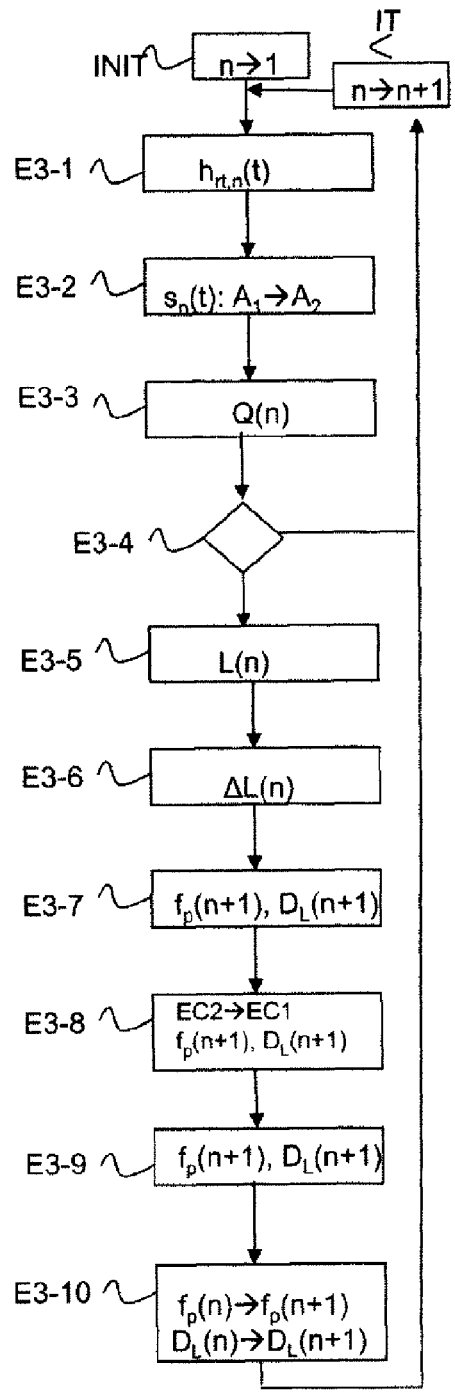
FIG. 6 represents the steps of the method for dynamically controlling the focus of a signal pre-equalized by time reversal according to a third embodiment.

A third embodiment of the method for dynamically controlling the focus of a signal pre-equalized by time reversal between a source communicating entity EC1 and a destination communicating entity EC2 is now described with reference to FIG. 6.

The method is reiterated according to a configurable iteration frequency $F_{iter}$. During the data transmission time from the source communicating entity to the destination communicating entity, the iteration frequency may, for example, be determined according to the frequency with which an effective channel estimation is obtained. The iterations are symbolically represented by an iteration step IT with an index n. A preliminary initialization step INIT corresponds to the index n=1.

During the initialization step INIT, the source communicating entity selects a carrier frequency $f_p(1)$ and a latency delay $D_L(1)$ for the transmission of a data signal pre-equalized by time reversal. The carrier frequency and the latency delay corresponding to the $n^{th}$ iteration of the method are respectively denoted $f_p(n)$ and $D_L(n)$.

In the step E3-1, the source communicating entity determines pre-equalization coefficients to be applied to a data signal. The pre-equalization coefficients applied to a data or reference signal, transmitted at a current instant, are given by the time reversal of an estimated impulse response $h_{rt,n}(t)$ of a propagation channel $C_n(EC1 \rightarrow EC2)$ between the source antenna $A_1$ and the destination antenna $A_2$.

This determination can be made, for example, by the transmission of pulses or pilot signals by the source communicating entity, followed by an estimation of the propagation channel respectively by the source or destination communicating entity, respectively according to the FDD or TDD transmission mode. In the case of an estimation made by the destination entity, the latter delivers the estimation to the source communicating entity.

In the step E3-2, the source communicating entity transmits from the source antenna $A_1$ the pre-equalized data signal $s_n(t)$ obtained after pre-filtering by the pre-equalization coefficients determined during the step E3-1.

In the step E3-3, the evaluator EVAL2 of the destination communicating entity evaluates a relative focus quality $Q(n)$ from the received signal, for example according to one of the methods described previously.

In the step E3-4, the destination communicating entity EC2 determines, in light of the relative focus quality $Q(n)$, whether there is a need to ask the source communicating entity EC1 for a focus modification. One criterion applied may, for example and in a nonlimiting manner, correspond to the comparison of the relative focus quality $Q(n)$ to a target relative focus quality $Q_{target}$. If the deviation between the relative focus quality and the target relative focus quality is below a configurable threshold, the destination communicating entity does not request any focus modification.

If there is no need to ask for a focus modification, the iterations E3-5 to E3-10 are not carried out.

In a variant, the destination communicating entity does not apply any criterion and the iterations E3-5 and following are performed systematically.

In the step E3-5, the destination communicating entity estimates a distance $L(n)$ between the destination antenna and the focal point. The focal point corresponds to the position of the destination antenna relative to the source antenna on the $n^{th}$ iteration before the latency delay has elapsed.

The estimation of the distance $L(n)$ may, for example, be made from reading a relative focus quality table. The configurable quality table contains measurement points for various positions of the destination antenna. These measurements can be made beforehand by simulations or by relative focus quality evaluations made during a learning period by the destination communicating entity.

In the case of an evaluation of the relative focus quality by a 0 order Bessel function as described previously, the evaluation of the distance may also be made based on the Bessel function, such that:

$$\text{Bessel}(L(n)) = Q(n).$$

In the step E3-6, the destination communicating entity estimates a distance $\Delta L(n)$ between the destination antenna and a position $P_{target}$ corresponding to the target relative focus quality $Q_{target}$.

The estimation of the distance $\Delta L(n)$ may, for example, be made from reading the relative quality table described previously that can be used to evaluate a target distance $L_{target}$ between the position $P_{target}$ and the focal point. The distance $\Delta L(n)$ is then obtained by the difference between $L(n)$ and $L_{target}$.

In the case of an evaluation of the relative focus quality by a 0 order Bessel function as described previously, the evaluation of the target distance $L_{target}$ may also be made based on the Bessel function, such that:

$$\text{Bessel}(L_{target}) = Q_{target}$$

In a variant, the estimation of the distance $\Delta L(n)$ may also be made based on the value $L_{target}$ configured previously.

In the step E3-7, the destination communicating entity selects a value for at least one parameter chosen from a carrier frequency and a latency delay. The selection is made based on properties of the normalized representation of the power curve for the received signal illustrated in FIG. 3, which is such that:

on the one hand, it is decreasing as a function of the distance to the focal point and therefore as a function of the product of the relative movement v and of the latency delay $D_L$, and, on the other hand, it is such that, for a given distance $L(n)$ between the destination antenna and the focal point, if $Q_1$ and $Q_2$ are two relative focus quality values for respective carrier frequencies $f_1$ and $f_2$, $f_1$ being less than $f_2$, then $Q_1$ is greater than $Q_2$.

The destination communicating entity can thus select a new carrier frequency, or else select a new latency delay, or even select both carrier frequency and latency delay in order to honor the focus modification request. The selection is thus made by comparison of the various normalized representations for the various carrier frequencies. These normalized representations of received power curves are, for example, pre-stored in the destination communicating entity in the form of a quality table.

The selection can be made by choosing a carrier frequency from one and the same frequency band, but also from a distinct frequency band or even by choosing another radio communication system.

In the step E3-8, the transmitter EMET2 of the destination communicating entity sends a focus modification request to the source communicating entity.

This request corresponds to the transmission of a request containing a reference to the selected frequency value and/or the selected latency delay.

In the step E3-9, the receiver REC1 of the source communicating entity receives the focus modification request and extracts from the request the reference to the value of the selected frequency and/or of the selected latency delay.

In the step E3-10, the selector SEL1 of the source communicating entity modifies the transmission parameters selected during the step E3-9 by the destination communicating entity.

The steps of the method are reiterated with this new pair of parameters $f_p(n+1)$, $D_L(n+1)$.

In a variant, after the modification request has been received by the receiver REC1 of the source communicating entity during the step E3-9, the source communicating entity selects a value for at least one parameter chosen from a carrier frequency and a latency delay based on the reference transmitted by the source communicating entity. This selection can be made as described in step E3-6.

The selector SEL1 of the source communicating entity then modifies the transmission parameters. In this case, these new parameters can be taken into account by the destination communicating entity after notification by the source communicating entity, or else by blind-type time and frequency synchronization methods well known to those skilled in the art.

Figure 7:
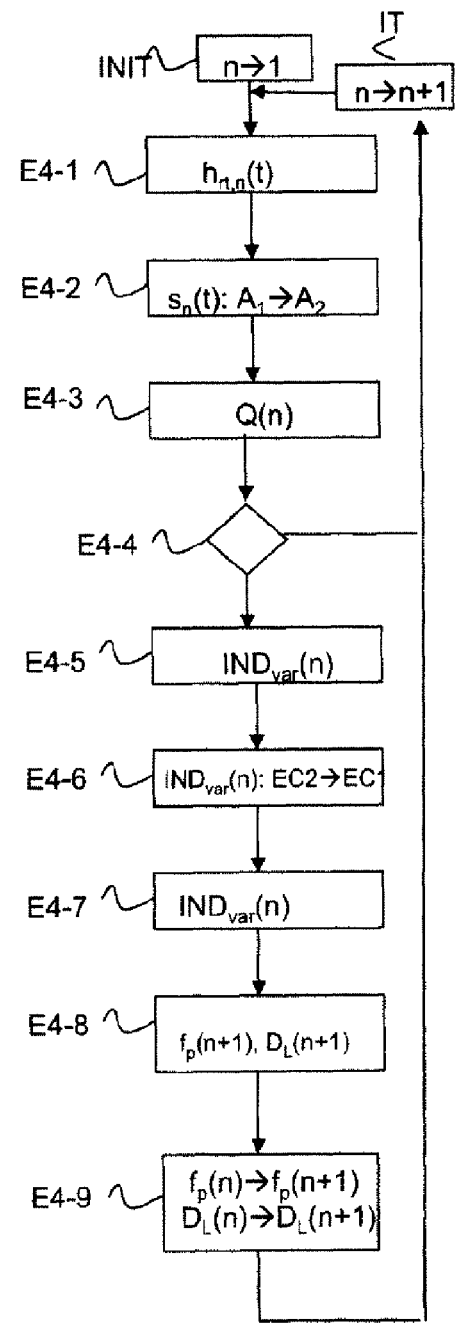
FIG. 7 represents the steps of the method for dynamically controlling the focus of a signal pre-equalized by time reversal according to a fourth embodiment.

A fourth embodiment of the method for dynamically controlling the focus of a signal pre-equalized by time reversal between a source communicating entity EC1 and a destination communicating entity EC2 is now described with reference to FIG. 7.

The method is reiterated according to a configurable iteration frequency $F_{iter}$. During the data transmission time from the source communicating entity to the destination communicating entity, the iteration frequency may, for example, be determined according to the frequency with which an effective channel estimation is obtained. The iterations are symbolically represented by an iteration step IT with an index n. A preliminary initialization step INIT corresponds to the index n=1.

During the initialization step INIT, the source communicating entity selects a carrier frequency $f_p(1)$ and a latency delay $D_L(1)$ for the transmission of a data signal pre-equalized by time reversal. The carrier frequency and the latency delay corresponding to the $n^{th}$ iteration of the method are respectively denoted $f_p(n)$ and $D_L(n)$.

In the step E4-1, the source communicating entity determines pre-equalization coefficients to be applied to a data signal. The pre-equalization coefficients applied to a data or reference signal, transmitted at a current instant, are given by the time reversal of an estimated impulse response $h_{rt,n}(t)$ of a propagation channel $C_n(EC1\rightarrow EC2)$ between the source antenna $A_1$ and the destination antenna $A_2$.

This determination can be made, for example, by the transmission of pulses or pilot signals by the source communicating entity, followed by an estimation of the propagation channel respectively by the source or destination communicating entity, respectively according to the FDD or TDD transmission mode. In the case of an estimation made by the destination entity, the latter delivers the estimation to the source communicating entity.

In the step E4-2, the source communicating entity transmits from the source antenna $A_1$ the pre-equalized data signal $s_n(t)$ obtained by pre-filtering by the pre-equalization coefficients determined during the step E4-1.

In the step E4-3, the evaluator EVAL2 of the destination communicating entity evaluates a relative focus quality $Q(n)$ from the received signal, for example according to one of the methods described previously.

In the step 4-4, the destination communicating entity EC2 determines, in light of the relative focus quality $Q(n)$, whether there is a need to ask the source communicating entity EC1 for a focus modification. One criterion applied may, for example and in a nonlimiting manner, correspond to the comparison of the relative focus quality $Q(n)$ to a target relative focus quality $Q_{target}$. If the deviation between the relative focus quality and the target relative focus quality is below a configurable threshold, the destination communicating entity does not request any focus modification.

If there is no need to request a focus modification, the iterations E4-5 to E4-9 are not carried out.

In a variant, the destination communicating entity does not apply any criterion and the iterations E4-9 and following are performed systematically.

In the step E4-5, the destination communicating entity determines the deviation $\Delta Q(n)$ between the relative focus quality $Q(n)$ evaluated in the step E4-4 and the target relative focus quality $Q_{target}$. Depending on the properties of the received power curves which are monotonic, decreasing as a function of the distance to the focal point, the destination entity, in light of the sign of the deviation $\Delta Q(n)$, determines whether the destination antenna is too close to or too far from the focal point for it to be able to obtain the relative focus quality $Q_{target}$. The destination communicating entity thus defines a variation index $IND_{var}(n)$ indicating its desire to move away from or move closer to the focal point. The variation index may, for example and in a nonlimiting manner, be the sign, or even the value of the deviation $\Delta Q(n)$.

In the step E4-6, the transmitter EMET2 of the destination communicating entity sends a focus modification request to the source communicating entity.

This request corresponds to the transmission of a request containing the variation index $IND_{var}(n)$ determined during the step E1-6.

In the step E4-7, the receiver REC1 of the source communicating entity receives the focus modification request and extracts the variation index $IND_{var}(n)$ contained in the request.

In the step E4-8, the source communicating entity selects a value for at least one parameter chosen from a carrier frequency and a latency delay corresponding to the variation index $IND_{var}(n)$. Thus, in the case of an index corresponding to a request to move closer to the focal point, the source communicating entity selects a pair $[f_p(n+1), D_L(n+1)]$ such that the product $f_p(n+1) \cdot D_L(n+1)$ is less than the product $f_p(n) \cdot D_L(n)$.

For example, the source communicating entity selects a frequency $f_p(n+1)$ below the frequency $f_p(n)$, or else obtained by a frequency offset by a configurable value $-\Delta f$.

The source communicating entity can also select a latency delay $D_L(n+1)$ less than the latency delay $D_L(n)$, or even obtained by decrementing a configurable delay $\Delta t$.

The source communicating entity may also combine the change of carrier frequency and the change of latency delay. The selection of a carrier frequency may also be made in one and the same frequency band, in a distinct frequency band or even for another radio communication system.

Similarly, in the case of a variation index $IND_{var}(n)$ corresponding to a request to move away from the focal point, the source communicating entity selects a pair $[f_p(n+1), D_L(n+1)]$ such that the product $f_p(n+1) \cdot D_L(n+1)$ is greater than the product $f_p(n) \cdot D_L(n)$.

In the step E4-9, the selector SEL1 of the source communicating entity modifies the transmission parameters selected during the step E4-8. The steps of the method are reiterated with this new pair of parameters $f_p(n+1), D_L(n+1)$.

These new parameters can be taken into account by the destination communicating entity after notification by the source communicating entity, or even by blind-type time and frequency synchronization methods well known to those skilled in the art.

The method may also be implemented for a bidirectional transmission. In this particular embodiment, the method is implemented in both transmission directions in such a way that the signals are not transmitted simultaneously in both transmission directions.

The invention described here relates to a device for dynamically controlling the focus of a signal pre-equalized by time reversal implemented in a destination communicating entity. Consequently, the invention also applies to a computer program, notably a computer program on or in an information storage medium, suitable for implementing the invention. This program may use any programming language, and be in the form of source code, object code, or an intermediate code between source code and object code such as in a partially compiled form, or in any other form that is desirable for implementing those of the steps of the method according to the invention that are implemented in the destination communicating entity.

The invention described here also relates to a device for dynamically controlling the focus of a signal pre-equalized by time reversal implemented in a source communicating entity. Consequently, the invention also applies to a computer program, notably a computer program on or in an information storage medium, suitable for implementing the invention. This program may use any programming language, and be in the form of source code, object code, or an intermediate code between source code and object code, such as in a partially compiled form, or in any other form that is desirable for implementing those of the steps of the method according to the invention that are implemented in the source communicating entity.

What is claimed is:

1. A method for dynamically controlling a focus of a signal pre-equalized by time reversal of an estimated propagation channel between a source antenna of a source communicating entity and a destination antenna of a destination communicating entity at a current instant, the method comprising steps for:

evaluating, by the destination communicating entity, a relative focus quality of the pre-equalized signal sent by the source antenna and received by the destination antenna, compared to a quality at a focal point, and if the evaluated relative focus quality does not satisfy a predetermined criterion, requesting, by the destination communicating entity, to modify the focus addressed to the source communicating entity for a subsequent instant.

2. The method as claimed in claim 1, wherein the relative focus quality is determined from a normalized representation of a received power curve, as a function of a distance between the destination antenna and the focal point, said representation being a decreasing function of the distance and having a maximum at the focal point.

3. The method as claimed in claim 1, wherein the modification request step comprises:

estimating a distance between the destination antenna at the current instant and a position corresponding to a target relative focus quality; and transmitting a modification request addressed to the source communicating entity including the estimation of said distance.

4. The method as claimed in claim 1, wherein the modification request step comprises:

estimating a deviation between the relative focus quality value evaluated at the current instant and a target relative focus quality value; and transmitting a modification request addressed to the source communicating entity including the estimation of the deviation.

5. The method as claimed in claim 1, wherein the modification request step comprises:

estimating a distance between the destination antenna at the current instant and a position corresponding to a target relative focus quality, selecting a value for at least one parameter, for the next instant, chosen from a carrier frequency and a latency delay, and transmitting a request addressed to the source communicating entity, including a reference to the value of the at least one selected parameter.

6. The method as claimed in claim 1, wherein the modification request step comprises:

comparing an estimation of the relative focus quality and a target relative focus quality, determining a variation index $IND_{var}(n)$ as a function of the result of the comparison, transmitting a modification request addressed to the source communicating entity including the variation index.

7. The method as claimed in claim 1, wherein, upon receipt of the modification request, the source communicating entity modifies a value for at least one parameter, for the next instant, chosen from a carrier frequency and a latency delay.

8. A non-transitory computer program product for a destination communicating entity comprising software instructions for controlling the implementation by said entity of those of the steps of the method as claimed in claim 1 when the program is run by the destination communicating entity.

9. A non-transitory computer program product for a source communicating entity comprising software instructions for controlling the implementation by said entity of those of the steps of the method as claimed in claim 1 when the program is run by the source communicating entity.

10. A device, for a destination communicating entity, for dynamically controlling a focus of a signal pre-equalized by time reversal of an estimated propagation channel between a source antenna of a source communicating entity and a destination antenna of the destination communicating entity at a current instant, the device comprising:

an evaluator for evaluating a relative focus quality of the pre-equalized signal transmitted by the source antenna and received by the destination antenna, relative to a quality at a focal point, and a requestor for requesting a focus modification addressed to the source communicating entity for a subsequent instant.

11. A communicating entity of a radio communication system comprising at least one of the devices as claimed in claim 10.

12. A radio communication system comprising at least one communicating entity as claimed in claim 10.

13. A device, for a source communicating entity, for dynamically controlling a focus of a signal pre-equalized by time reversal of an estimated propagation channel between a source antenna of a source communicating entity and a destination antenna of the destination communicating entity at a current instant, the device comprising:

a receiver for receiving a focus modification request transmitted by the destination communicating entity, a modifying element for modifying a value for at least one parameter chosen from a carrier frequency and a latency delay.

14. A communicating entity of a radio communication system comprising at least one of the devices as claimed in claim 13.

15. A radio communication system comprising at least one communicating entity as claimed in claim 14.

* * * * *